United States Patent [19]
Janelle et al.

[11] Patent Number: 5,562,165
[45] Date of Patent: Oct. 8, 1996

[54] HYDRAULIC FLOATING SYSTEM FOR DOWNPRESSURE CONTROL OF SEEDING TOOLS

[75] Inventors: Luc Janelle, St-Germain; Claude Laguë, Québec; Sylvio Tessier, Pont Rouge, all of Canada

[73] Assignee: Universite Laval, Quebec, Canada

[21] Appl. No.: 212,902

[22] Filed: Mar. 14, 1994

[51] Int. Cl.$^6$ .................................................. A01B 63/111
[52] U.S. Cl. .............................. 172/4; 172/315; 172/263; 111/926
[58] Field of Search .............................. 172/4, 315, 316, 172/263, 664; 111/926

[56] References Cited

U.S. PATENT DOCUMENTS

| | | |
|---|---|---|
| 1,808,759 | 6/1931 | Bickerton . |
| 2,750,862 | 6/1956 | Garmager . |
| 2,964,113 | 12/1960 | Presnell et al. . |
| 4,209,067 | 6/1980 | Poggemiller et al. . |
| 4,291,638 | 9/1981 | Renwick . |
| 4,333,534 | 6/1982 | Swanson et al. . |
| 4,353,423 | 10/1982 | Poggemiller et al. . |
| 4,422,511 | 12/1983 | Poggemiller et al. . |
| 4,431,061 | 2/1984 | White . |
| 4,506,609 | 3/1985 | Fuss et al. . |
| 4,648,466 | 3/1987 | Baker et al. . |
| 4,909,331 | 3/1990 | Defranco ............................. 172/4 |
| 4,913,070 | 4/1990 | Morrison, Jr. . |
| 5,065,681 | 11/1991 | Hadley . |

FOREIGN PATENT DOCUMENTS

| | | | |
|---|---|---|---|
| 3415922 | 11/1985 | Germany ............................. | 172/4 |
| 3431682 | 3/1986 | Germany ............................. | 172/4 |
| 502622 | 2/1976 | U.S.S.R. ............................. | 111/926 |

*Primary Examiner*—Spencer K. Warnick, IV
*Attorney, Agent, or Firm*—Klauber & Jackson

[57] ABSTRACT

A hydraulic downpressure system for use on no-tillage seeders allows for a constant downward force to be applied on seeding tools operating in highly variable soil surface conditions in order to keep a uniform seeding or planting depth. Raising and lowering of the seeding units can also be achieved with this hydraulic system. A double acting hydraulic cylinder is principally used having its rod end connected to one or two seeding units. A hydraulically operated two-way mode selection valve provides system shifting between both modes involved. The first mode is used when transporting the seeder on roads and to operate the seeding tools in the field. Control is then provided by a three-way directional valve mounted to an external hydraulic power supply, such as an agricultural tractor. Raising and lowering of the seeding tools can be achieved when operating in this mode. A second mode is involved when the seeding tools are working into the ground to sow seeds. Pressure applied on both ports of the hydraulic cylinder comes from a nitrogen accumulator that acts as a pressure absorber which results in a net downward force. The cylinder can thus move independently while always maintaining the same force. A second three-way directional valve regulates the pressure in the accumulator and protects system from overload pressure. Downpressure adjustment is directly dependent from this control valve. A pressure compensator prevents a differential of pressure during system mode changes. The force from one cylinder can be applied on two seeding units using a double linkage system.

8 Claims, 2 Drawing Sheets

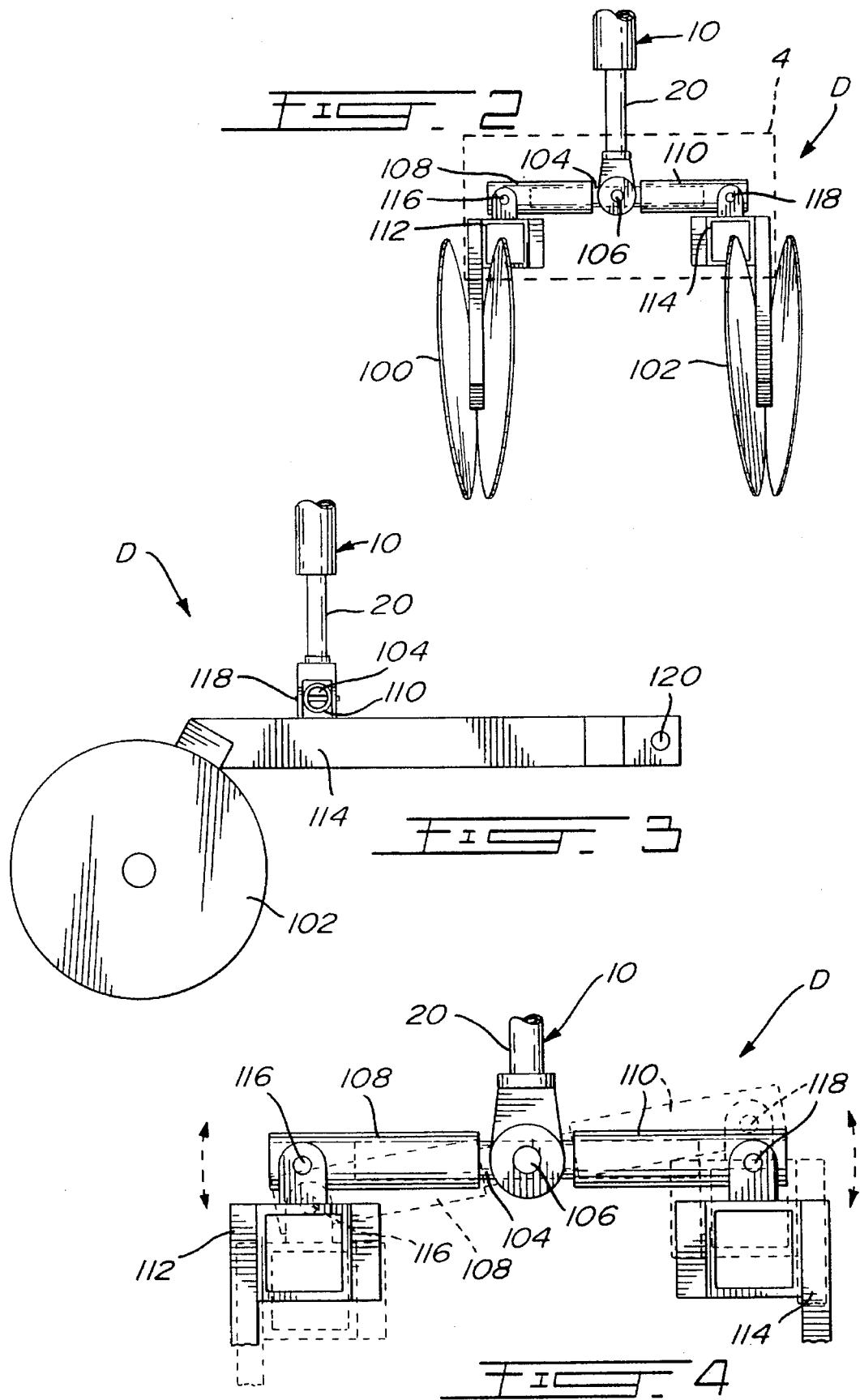

HYDRAULIC FLOATING SYSTEM FOR DOWNPRESSURE CONTROL OF SEEDING TOOLS

BACKGROUND OF THE INVENTION

1. Field of the Invention

The present invention relates principally to a hydraulic system for controlling the position of seeding or tillage tools used for agricultural operations and, more particularly, for no-tillage seeding or planting of cereal crops and others. Soil conditions are more particular in no-tillage seeding due to the absence of soil leveling by tillage. The present invention also relates to a system having a carrying mode and a ground following mode.

2. Description of the Prior Art

No-tillage seeding requires considerable seeding tool downpressure to penetrate residue-covered soil and to open a furrow in sometimes hard soils to ensure proper seeding depth. Most of the available seeders use a mechanical spring to transfer weight from the seeder frame to individual seeding units. The force applied by these springs is not constant due to the compression and extension of the springs when the seeding tools encounter different soil surface elevations. The seeding tool penetration into soil and depth control is thus unreliable due to such varying downward forces which are applied. Manual adjustment of each spring has to be done to obtain the right downpressure force on each seeding tool for given surface and soil conditions. Raising and lowering of the seeding units in this case can only be accomplished by either moving the seeder frame or by operating a common seeding tool bar linked to the frame. These systems require considerable space on the seeder and performance is highly dependent on field surface leveling conditions.

U.S. Pat. No. 4,648,466 issued to Baker et al. on Mar. 10, 1987 describes a system to hydraulically control seeding tools from a tractor. Two hydraulic accumulators provide pressure on the seeding tool's hydraulic cylinders when the seeder is in operation. The first accumulator is always at a same pressure as the seeding tool's hydraulic cylinders, while the second accumulator is used as a cushioning system to prevent excess pressure in the hydraulic lines. No provision is made to detect pressure variations when the system shifts from a tractor mode for lifting the seeding tool to an accumulator mode used during the actual seeding operation. Accumulator pressure can thus vary due to the pressure differential when raising and lowering the seeding tool. Correction of the floating system pressure has to be made manually with a second tractor directional valve. Furthermore, this hydraulic control system requires one hydraulic cylinder for each seeding tool.

U.S. Pat. No. 5,065,681 issued to Hadley on Nov. 19, 1991 discloses a hydraulic downpressure structure for an implement having multiple ground engaging tools, wherein the pressure is maintained constant on the ground engaging tools by way of a hydraulic system accompanied by a spring 82. Such a spring will result in a variable force on the ground engaging tool in view of the ground surface irregularities.

U.S. Pat. No. 4,333,534 issued on Jun. 8, 1982 to Swanson et al. discloses a pivoted mechanical structure and a passive cylinder to cause the wheels 27, 32 to follow the soil surface while maintaining constant the depth of the disks 31. The force on the tool bars 10 issues from the contact of these wheels with the ground rather than from the penetration of the disks 31 in the soil.

U.S. Pat. No. 4,506,609 issued on Mar. 26, 1985 to Fuss et al. uses two independent hydraulic systems for the raising and lowering of the seeders and for the depth control of these seeders which thus can float along the profile of the terrain. No interactive control of the force applied by the system on the seeders is provided.

U.S. Pat. Nos. 2,750,862 issued to Garmager on Jun. 19, 1956, No. 2,964,113 issued to Presnell et al. on Dec. 13, 1960 and No. 4,431,061 issued on Feb. 14, 1984 to White all disclose passive hydraulic systems for maintaining a farm implement in place.

U.S. Pat. No. 1,808,759 issued to Bickerton on Jun. 9, 1931 teaches a primitive system for raising an agricultural implement and of manually controlled variable pressurization.

U.S. Pat. No. 4,291,638 issued to Renwick on Sep. 29, 1981 describes an agricultural implement and a passive hydraulic-mechanical system for adjusting the force acting on the springs of this implement. As in the previous patent to Bickerton, there is no interactive control of this force in Renwick.

U.S. Pat. Nos. 4,209,067 issued on Jun. 24, 1980, No. 4,353,423 issued on Oct. 12, 1982 and No. 4,422,511 issued on Dec. 27, 1983, all in the name of Poggemiller et al., all teach the use of fully extended cylinders to which are mounted various farming implements and which act as a protection mechanism against breakage which could result from irregularities in the soil surface such as rocks.

U.S. Pat. No. 4,913,070 issued on Apr. 3, 1990 to Morrison, Jr. discloses an apparatus for controlling the depth of soil penetration of an agricultural ground contact implement, wherein there is provided a continuous dynamic regulating of an adjustable downpressure system in response to translocational movement of a depth gauging wheel.

A major improvement to hydraulic pressure systems for seeders brought about by the present invention results in the correction of these disadvantages. As well, the improvement includes the possibility of coupling two seeding tools to a same hydraulic cylinder by means of a double linkage system, thereby reducing cost. The present improved hydraulic force control system allows for significantly more precise no-tillage seeding for most soil conditions.

SUMMARY OF THE INVENTION

It is therefore an aim of the present invention to provide a novel hydraulic system for operating a double acting hydraulic cylinder for precise control of the force applied on a ground working tool in view, for instance, of having a constant tool penetration depth in the soil.

It is also an aim of the present invention to provide a new double linkage to operate two seeding tool drag arms with a single hydraulic cylinder.

Therefore, in accordance with the present invention, there is provided an apparatus for operating a ground engaging implement comprising a first double acting cylinder means having opposite ends adapted to be connected to a frame means of the apparatus and to the ground engaging implement, the first hydraulic cylinder means having thrust and draw sides; a hydraulic circuit comprising a mode selection valve having first and second positions, a first three-way directional valve adapted for connection to pump means and to reservoir means, a pressure absorption means, actuating means for the mode selection valve, and detection means; the mode selection valve being adapted in the first position thereof to connect the thrust and draw sides of the first cylinder means to the first directional valve, wherein in a first position of the first directional valve oil from the pump is delivered to the thrust side for extending the first cylinder means and thus lowering the implement in the ground, whereas in a second position thereof oil is delivered to the draw side to cause the implement to raise; the mode selection valve being adapted in a second position thereof to connect the thrust and draw sides of the first cylinder means to the pressure absorption means for providing substantially equal and constant pressures in both the thrust and draw sides of the first cylinder means with a substantially constant downward force resulting therefrom in view of a smaller piston area on the draw side, whereby the first cylinder means is allowed to extend and retract to follow a surface profile of the ground while the implement maintains a substantially uniform operating depth; the detection means being adapted to detect oil pressure variations in the circuit when the first directional valve is operated to the first position thereof to lower the implement in the ground for causing the actuating means to shift the mode selection valve from the first position to the second position thereof when oil pressure in the thrust side is substantially equal to an accumulator pressure of the pressure absorption means, whereby substantial oil pressure variations of the accumulator pressure are prevented when shifting from an implement carrying mode to a ground working mode; wherein, for raising the implement, the first directional valve is shifted to the second position thereof, oil pressure from the pump means causing the mode selection valve to shift to the first position thereof thereby allowing oil pressure to act on the draw side.

A hydraulic system is thus used to control the hydraulic cylinder that raises and lowers the seeding or planting units and that also serves for maintaining a constant downward force on these components during field operation. It first consists of a series of double acting hydraulic cylinders, each one having its rod end connected to two seeding tools by means of a specially designed linkage and having its cylinder end connected to the seeder frame. There is half as many of such cylinders on a particular seeder or planter as there are seeding or planting units. The cylinder's ports are connected in parallel.

Hydraulic flow and pressure on both ports of these cylinders are applied through a hydraulically operated two-way mode selection valve. In a first position, this two-way valve connects the two ports of the hydraulic cylinder with a first three-way directional valve that controls the hydraulic flow to and from the reservoir and pump of an external hydraulic power unit such as an agricultural tractor. In this position, it is possible to extend or retract the hydraulic cylinder, and thus to raise or lower the seeding tools, by manually operating the first three-way directional valve.

In a second position, the two-way mode selection valve is connected to a pressure absorber such as a nitrogen accumulator. This accumulator provides equal pressure to both sides of the hydraulic cylinder piston resulting in a net downward force because of the smaller area of the piston on the rod side thereof. The pressure level in the accumulator is controlled by a second three-way directional valve that controls the hydraulic flow to and from the reservoir and pump of an external hydraulic power unit such as an agricultural tractor. With the two-way mode selection valve in its second position, the hydraulic cylinder generates a constant downward force while at the same time allowing for extension or retraction in order for seeding tools to follow the soil surface profile and maintain a uniform operating depth. The operator can modify the accumulator pressure, and hence the downward force exerted by the hydraulic cylinder on the seeding units, while operating, by manually activating the second three-way directional valve. A relief valve protects the system from overload pressures that could result from excess oil flow to the accumulator.

The two-way mode selection valve is hydraulically actuated by a double acting actuating hydraulic cylinder having its cylinder end port connected to a first hydraulic line extending between the two-way mode selection valve and the first three-way directional valve and having its rod end port connected through a relief valve to a second hydraulic line extending between the two-way mode selection valve and the first three-way directional valve. The relief valve allows oil to return to the reservoir when the actuating cylinder is retracted in order to bring the two-way mode selection valve from its second position to its first position.

A three-port two-piston hydraulic cylinder controls the operation of the mode selection valve actuating cylinder. The first port of the two-piston cylinder is connected to the hydraulic line that feeds oil to the thrust ports of the hydraulic cylinders controlling the seeding tools, downstream from the two-way mode selection valve. The second port of the two-piston cylinder is connected, through a check valve, to the draw port of the mode selection valve actuating cylinder. Finally, the third port of the two-piston cylinder is connected to the hydraulic line that connects the hydraulic accumulator to the thrust ports of the seeder hydraulic cylinders upstream from the two-way mode selection valve.

When the seeding tools need to be lowered, the first three-way directional valve is manually operated with the two-way mode selection valve in its first position. Oil flows to the thrust port of the seeder hydraulic cylinders which extend for lowering the seeding tools. At the same time, pressure from the external hydraulic power unit is applied to the left section of the two-piston hydraulic cylinder through its first port. As the seeding units are forced into the ground, hydraulic pressure builds up in the thrust chamber of the seeder hydraulic cylinder and in the rodless chamber of the two-piston cylinder. When the force exerted on the rodless face of the outer piston of the two-piston cylinder by the increasing hydraulic pressure becomes larger than the one exerted by the hydraulic accumulator on the rod face of the inner piston of that same cylinder through its third port, the rod of the two-piston cylinder moves inwardly, thus exposing its second port to the same pressure as its first port. Oil can then flow from the second port of the two-piston cylinder to the draw port of the actuating cylinder which results in the operation of the two-way mode selection valve from its first position to its second position.

During field operation, the two-way mode selection valve is in its second position and connects both ports of the seeder hydraulic cylinders to the accumulator. The accumulator maintains both chambers of the seeder hydraulic cylinder at the same adjustable (through the operation of the second three-way directional valve) pressure thereby yielding a net downward force on the seeding Units mounted at the rod ends of the seeder hydraulic cylinders. When the seeding units operated by a single seeder hydraulic cylinder encounter an obstacle that pushes them upward, it increases the pressure in the thrust chamber of the seeder hydraulic cylinder thereby forcing oil to flow from the thrust chamber to the draw chamber, thus allowing for cylinder retraction. In the opposite situation (seeding units forced downward because of gravity), the oil flow is reversed and the seeder hydraulic cylinder can extend downward.

When the seeding units need to be raised, the first three-way directional valve is actuated for directing oil flow from the external hydraulic power unit to the thrust port of the actuating cylinder. This displaces the two-way mode selection valve from its second position to its first position and oil flow from the external power unit can then be directed towards the draw ports of the seeder hydraulic cylinders which can then retract in order to raise the seeding units. The low pressure in the thrust chambers of the seeder hydraulic cylinders also allows the rod of the two-piston cylinder to move outward for thus isolating the first and second ports of that cylinder.

The force applied by the rod end of one seeder hydraulic cylinder is transmitted to two seeding units through a specially designed linkage in accordance with another aspect of the present invention. This linkage consists of three bars, three pin joints and two sliding joints.

The rod of the seeder hydraulic cylinder is connected to a center bar of the linkage by means of a pin joint placed at the center of the center bar. This pin joint allows the center bar and the rest of the linkage to rotate in a vertical plane perpendicular to the travel direction of the seeder or planter. Each end of the center bar is connected to the end of a respective one of two hollow bars through a sliding joint to allow for relative telescopic motion between the center bar and the two outer hollow bars. The outer end of each of these two hollow bars is connected to a drag arm of a respective seeding unit through another pin joint.

This design allows each seeding unit to independently move up and down to accommodate different field surface conditions. At the same time, it also requires half as many hydraulic cylinders as there are seeding units on the seeder or planter.

BRIEF DESCRIPTION OF THE DRAWINGS.

Having thus generally described the nature of the invention, reference will now be made to the accompanying drawings, showing by way of illustration a preferred embodiment thereof, and in which:

FIG. 2 is a rear elevational view of double linkage device in accordance with another aspect of the present invention for operating two seeding devices with a single hydraulic cylinder;

FIG. 3 is a side elevational view of the linkage device of FIG. 2; and

FIG. 4 is an enlarged rear elevational view of part of the linkage device of FIG. 2 taken within the box 4 shown in broken lines in FIG. 2, wherein there is shown in phantom lines an alternate position of the linkage device.

DESCRIPTION OF THE PREFERRED EMBODIMENTS

Figure 1:
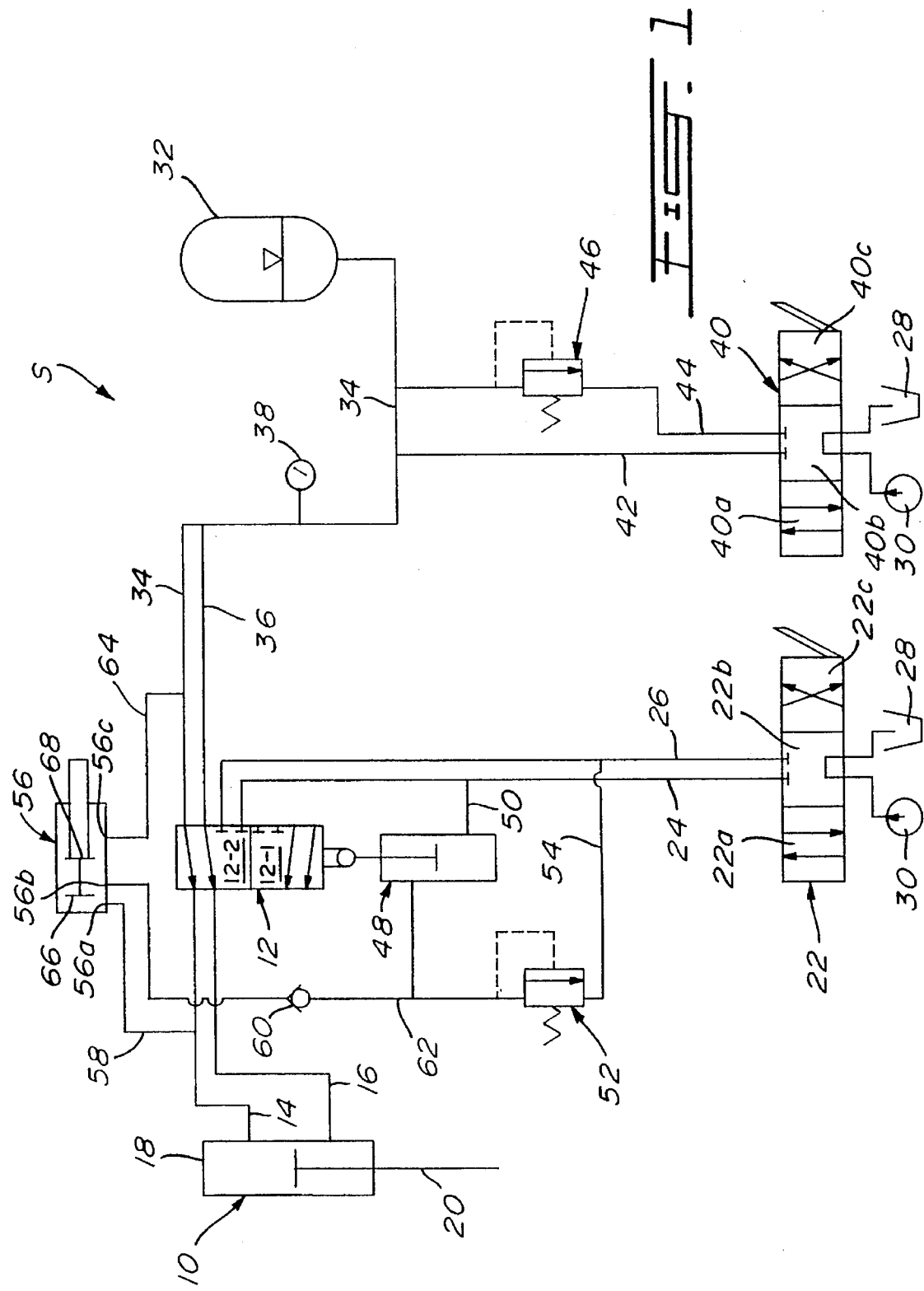
FIG. 1 is a schematic representation of a hydraulic circuit in accordance with the present invention for precisely controlling the force applied on a ground working implement, such as a no-tillage seeding tool.

In accordance with the present invention, FIG. 1 illustrates a hydraulic system S which is used to control the hydraulic cylinder that raises and lowers the seeding or planting units and that also serves for maintaining a constant downward force on these components during field operation.

Each cylinder of a series of double hydraulic cylinders 10 (only one cylinder 10 being shown in FIG. 1) is connected to a hydraulically operated two-way mode selection valve 12 via a line 14 on its thrust port and via line 16 on its draw port. The ports of the cylinders 10 are connected in a parallel fashion in order to have a common pressure. A cylinder end 18 of the hydraulic cylinder 10 is connected to the seeder frame (not shown) and a rod end 20 thereof is connected to a double linkage system (see FIGS. 2 to 4) which supports two seeding units, as explained in details hereinbelow.

Control of hydraulic flow and pressure on both ports of these hydraulic cylinders 10 comes from the hydraulically operated two-way mode selection valve 12. In a first position 12-1 (bottom section of the valve 12 on FIG. 1), the mode selection valve 12 connects the two ports of the hydraulic cylinders 10 with a first three-way directional valve 22 via lines 24 and 26. The three-way directional valve 22 can be manually operated to control the flow to and from a reservoir 28 and a pump 30 of an external power unit (not shown), such as an agricultural tractor, and thus allows for retraction of the hydraulic cylinder 10 in position 22a of the directional valve 22 and for extension of the cylinder 10 in position 22c of valve 22 for respectively raising and lowering the seeding tools. The three-way directional valve 22 is in neutral position when placed in position 22b.

In position 12-2 (top section of the valve 12 in FIG. 1), the mode selection valve 12 is connected to a pressure absorber such as a, nitrogen accumulator 32 via lines 34 and 36. The accumulator 32 provides equal pressure to both sides of the piston of the hydraulic cylinder 10 thereby resulting in a net downward force because of the smaller area of the piston on the rod side thereof.

A gauge 38 installed on line 34 displays pressure in the accumulator 32 for a better operation of system. The pressure level in the accumulator 32 is controlled by a second three-way directional valve 40 that controls the hydraulic flow to and from the reservoir 28 and pump 30 of the aforementioned external hydraulic power unit. With the mode selection valve 12 in position 12-2, the hydraulic cylinder 10 generates a constant downward force while at the same time allowing for extension or retraction of its piston in order that the seeding units can follow the soil surface profile while maintaining a uniform operating depth. The second three-way directional valve 40 is connected to the nitrogen accumulator 32 via lines 42 and 44. In position 40a, the second three-way directional valve 40 increases pressure in the accumulator 32, whereas in position 40c, decrease of pressure can be achieved. The operator can thus modify the pressure in the accumulator 32, and hence the downward force exerted by the hydraulic cylinder 10 on the seeding units, while operating, by manually activating the directional valve 40. The second three-way directional valve 40 is in neutral position in 40b. A relief valve 46 installed on line 44 protects the system from overload pressures that could result from excess oil flow to the accumulator 32.

The two-way mode selection valve 12 is hydraulically actuated by a double acting hydraulic cylinder 48 having its cylinder end port connected to the hydraulic line 24 via a line 50 and having its rod end port connected, through a relief valve 52, to the line 26 via a line 54. The relief valve 52 allows oil to return to the reservoir 28 when the actuating cylinder 48 is extended in order to bring mode selection valve 12 from position 12-2 to position 12-1 thereof.

A three-port two-piston hydraulic cylinder 56 controls the operation of the mode selection valve actuating cylinder 48. A first port 56a of the cylinder 56 is connected via a line 58 to line 14 that feeds oil to the thrust ports of the hydraulic cylinders 10, downstream from the mode selection valve 12. A second port 56b of the two-piston cylinder 56 is connected, through a check valve 60, to the draw port of the mode selection valve actuating cylinder 48 via a line 62.

Finally, a third port 56c of the cylinder 56 is connected via a line 64 to the hydraulic line 34 that connects the hydraulic accumulator 32 to the thrust ports of the hydraulic cylinders 10, upstream from the mode selection valve 12.

When the seeding tools need to be lowered, the first directional valve 22 is manually operated to position 22c with the mode selection valve 12 being in position 12-1. Oil flows from hydraulic pump 30 by means of hydraulic lines 26 and 14 to the thrust port of the hydraulic cylinders 10 which extend for lowering the seeding tools. Oil from the draw ports of these same cylinders 10 returns to reservoir 28 by means of hydraulic lines 16 and 24. At the same time, pressure from the external hydraulic power unit is applied to the left section of hydraulic cylinder 56 through port 56a via line 58. As the seeding units are forced into the ground, hydraulic pressure builds up in the thrust chamber of the hydraulic cylinder 10 and on the left side of the cylinder 56. The force exerted on the left face of a left piston 66 of the cylinder 56 by the increasing hydraulic pressure eventually becomes larger than the one exerted by the hydraulic accumulator 32 on the right face of a right piston 68 of that same cylinder 56 through port 56c and line 64. The rod of cylinder 56 then moves to the right, thus exposing port 56b to the same pressure as port 56a. Oil can then flow from port 56b of the cylinder 56 to the draw port of the actuating cylinder 48 by means of line 62 which results in the operation of the mode selection valve 12 from position 12-1 to position 12-2.

During field operation, the first three-way directional valve 22 is in neutral position 22b. The mode selection valve 12 is in position 12-2 and connects both ports of the hydraulic cylinders 10 to the accumulator 32 by means of hydraulic lines 14, 16 and 34, 36. The accumulator 32 maintains both chambers of the hydraulic cylinders 10 at the same adjustable (through the operation of the second directional valve 40 via line 42) pressure yielding a net downward force on the seeding units mounted at the rod ends 20 of the cylinders 10. When the seeding units operated by a single cylinder 10 encounter an obstacle that pushes them upward, it increases the pressure in the thrust chamber of the cylinder 10 that forces oil to flow from the thrust chamber to the draw chamber by means of hydraulic lines 14, 16 and 34, 36 up to the accumulator 32, thus allowing for cylinder retraction. In the opposite situation (seeding units forced downward because of gravity), the oil flow is reversed and the cylinder 10 can extend.

When the seeding units need to be raised, the directional valve 22 is manually operated to position 22a which directs oil flow from the pump 30 of the external hydraulic power unit to the thrust port of the actuating cylinder 48 by means of lines 24 and 50. The mode selection valve 12 thus displaces from position 12-2 to position 12-1 and oil flow from the external power, unit is directed toward the draw ports of the cylinders 10 thereby causing the seeding units to raise. The low pressure in the thrust chambers of the cylinders 10 also allows the rod of the two-piston cylinder 56 to move leftward thus isolating ports 56a and 56b of that cylinder 56. The cylinder ends 18 are also connected to the main frame in order to transfer the weight from the seeder or planter to each seeding unit, such as seeding units 100 and 102 (see FIGS. 2 to 4).

With reference to FIGS. 2 to 4, a two-linkage device D connected to the rod end 20 of the cylinder 10 is provided to allow the cylinder 10 to raise or lower both seeding units 100 and 102 at the same time while applying the required force thereon. The rod end 20 of the hydraulic cylinder 10 is connected to a first central bar 104 of the linkage D by means of a pin joint 106 placed at the center of the first bar 104. The pin joint 106 allows the central bar 104 and the rest of the linkage D to rotate or pivot in a vertical plane perpendicular to the travel direction of the seeder or planter (see phantom lines of FIG. 4). The ends of the central bar 104 are slidably received in respective inner ends of a pair of hollow annular bars 108 and 110 through a sliding joint which allows for relative telescopic motion between the bars 104, 108 and 110. The outer ends of these two hollow bars 108 and 110 are connected to respective drag arms 112 and 114 of the seeding units 100 and 102 by way of pin joints 116 and 118. The drag arms 112 and 114 are pivotally mounted at 120 to the frame of the seeder or planter (not shown).

During field operation, the cylinder 10 is placed at the center of both seeding units 100 and 102 to distribute equal forces on each seeding unit. When one unit 100, 102 encounters a soil deformation that discloses it upward or downward, the central bar 104 rotates about the pin joint 106 which results in the extension of the bars 104, 108 and 110. A rotation of the bars 108 and 110 about the pin joints 116 and 118 is provided relative to the drag arms 112 and 114. When both seeding units 100 and 102 have to move upward or downward depending on soil irregularities, the cylinder 10 extends or retracts with the same downward force due to the nitrogen accumulator action 32 of FIG. 1.

The combination telescopic motion of the double linkage D with the action of the cylinder 10 allows each seeding unit 100, 102 to independently move up and down to accommodate different field surface conditions. At the same time, half as many hydraulic cylinders 10 are required as there are seeding units on the seeder or planter.

We claim:

1. An apparatus for operating a ground engaging implement comprising a first double acting hydraulic cylinder means having opposite ends adapted to be connected to a frame means of said apparatus and to said ground engaging implement, said first hydraulic cylinder means having thrust and draw sides; a hydraulic circuit containing oil and comprising a mode selection valve having first and second positions; a first three-way directional valve adapted for connection to pump means and to reservoir means, said pump means being adapted to supply oil in said hydraulic circuit, a pressure absorption means, actuating means for said mode selection valve, and detection means; said mode selection valve being adapted in said first position thereof to connect said thrust and draw sides of said first cylinder means to said first directional valve, wherein in a first position of said first directional valve oil from the pump means is delivered to said thrust side for extending said first cylinder means and thus lowering said implement in the ground, whereas in a second position thereof oil is delivered to said draw side to cause said implement to raise; said mode selection valve being adapted in a second position thereof to connect said thrust and draw sides of said first cylinder means to said pressure absorption means for providing substantially equal and constant pressures in both said thrust and draw sides of said first cylinder means with a substantially constant downward force resulting therefrom in view of a smaller piston area on said draw side, whereby said first cylinder means is allowed to extend and retract to follow a surface profile of the ground while said implement maintains a substantially uniform operating depth; said detection means being adapted to detect oil pressure variations in said circuit when said first directional valve is in said first position thereof such as to lower said implement in the ground and to cause said actuating means to shift said mode selection valve from said first position to said second position upon reaching an oil pressure in said thrust side which is dependent of an accumulator pressure of said pressure absorption means, whereby substantial oil pressure variations of said accumulator pressure are prevented when shifting from an implement carrying mode to a ground working mode; wherein, for raising said implement, said first direction valve is shifted to said second position thereof, oil pressure from said pump means causing said mode selection valve to shift to said first position thereof thereby allowing oil pressure to act on said draw side.

2. An apparatus as defined in claim 1, wherein said detection means comprises a second hydraulic cylinder means in fluid communication at opposite ends thereof respectively with said thrust side of said first cylinder means and with said pressure absorption means.

3. An apparatus as defined in claim 2, wherein said second cylinder means is a three-port two-piston cylinder comprising first and second end ports in fluid communication with said thrust side of said first cylinder means and with said pressure absorption means and an intermediate port in fluid communication with said actuating means, whereby in said first positions of said mode selection valve and first directional valve, said oil pressure in said thrust side exerts a first force on said three-port two-piston cylinder by way of said first end port, whereas said accumulator pressure exerts a second force on said three-port two-piston cylinder by way of said second end port such that when said first force becomes greater than said second force, said three-port two-piston cylinder is displaced such as to expose said intermediate port to said oil pressure of said thrust side thereby causing said actuating means to displace said mode selection valve from said first position to said second position.

4. An apparatus as defined in claim 3, wherein pressure varying means are provided for selectively adjusting said accumulator pressure thereby allowing said downward force on said ground engaging implement to be modified with said mode selection valve being in said second position.

5. An apparatus as defined in claim 4, wherein said pressure varying means comprise a second three-way directional valve connected to said pump means and to said reservoir means and in fluid communication with said pressure absorption means.

6. An apparatus as defined in claim 1, wherein said pressure absorption means comprises a gas accumulator.

7. An apparatus as defined in claim 6, wherein said gas is nitrogen.

8. An apparatus as defined in claim 3, wherein said intermediate port and said first three-way direction valve are in fluid communication with opposite ends of said actuating means.

* * * * *